(12) United States Patent
Belghoul et al.

(10) Patent No.: US 9,414,422 B2
(45) Date of Patent: Aug. 9, 2016

(54) PROXIMITY DETECTION FOR MOBILE COMMUNICATION DEVICES USING GEO-FENCING

(71) Applicant: Broadcom Corporation, Irvine, CA (US)

(72) Inventors: Farouk Belghoul, Campbell, CA (US); Dutt H. Kalapatapu, Santa Clara, CA (US); Kamesh Medapalli, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 141 days.

(21) Appl. No.: 14/150,492

(22) Filed: Jan. 8, 2014

(65) Prior Publication Data
US 2014/0192737 A1 Jul. 10, 2014

Related U.S. Application Data

(60) Provisional application No. 61/750,292, filed on Jan. 8, 2013.

(51) Int. Cl.
H04W 4/00 (2009.01)
H04W 76/02 (2009.01)
H04W 4/02 (2009.01)

(52) U.S. Cl.
CPC ............ *H04W 76/023* (2013.01); *H04W 4/008* (2013.01); *H04W 4/021* (2013.01); *H04W 4/023* (2013.01)

(58) Field of Classification Search
USPC ........ 370/229, 236, 252, 311, 328, 329, 331, 370/338; 455/404.2, 414.2, 422.1, 440, 455/456.1
See application file for complete search history.

(56) References Cited

U.S. PATENT DOCUMENTS

| | | | |
|---|---|---|---|
| 2006/0079244 A1* | 4/2006 | Posner et al. | 455/456.1 |
| 2011/0250901 A1* | 10/2011 | Grainger et al. | 455/456.1 |
| 2011/0286437 A1* | 11/2011 | Austin et al. | 370/338 |
| 2011/0301912 A1* | 12/2011 | Pandey et al. | 702/150 |
| 2012/0115512 A1* | 5/2012 | Grainger et al. | 455/456.3 |
| 2013/0072226 A1* | 3/2013 | Thramann | 455/456.1 |
| 2013/0114502 A1* | 5/2013 | Joshi | H04L 61/6086 370/328 |
| 2015/0011237 A1* | 1/2015 | Obermeyer et al. | 455/456.1 |

* cited by examiner

*Primary Examiner* — Kwang B Yao
*Assistant Examiner* — Nguyen Ngo
(74) *Attorney, Agent, or Firm* — Sterne, Kessler, Goldstein & Fox P.L.L.C.

(57) ABSTRACT

Systems and methods are provided for using geo-fencing techniques to assist in detecting mobile communication devices that are close enough to support direct communication. A mobile communication device can periodically report its geo-fence area to a central server. The server can determine whether to ask the communication device to report more precise geographic information (e.g., GPS information) based on whether another communication device eligible for direct communication is within the same geo-fence area.

21 Claims, 6 Drawing Sheets

PROXIMITY DETECTION FOR MOBILE COMMUNICATION DEVICES USING GEO-FENCING

CROSS REFERENCE TO RELATED APPLICATIONS

This application claims the benefit of U.S. Provisional Patent Application No. 61/750,292, filed on Jan. 8, 2013, which is incorporated by reference herein in its entirety.

FIELD OF THE DISCLOSURE

This disclosure relates to wireless communications, including proximity detection for wireless communication devices.

BACKGROUND

Mobile communication devices, such as cellular telephones, can communicate with each other through infrastructure provided by a service provider or directly using a wireless peer-to-peer (P2P) standard. Direct P2P communication between mobile communication devices uses less battery power than communication between the same devices through service provider infrastructure. Thus, using direct P2P communication can be advantageous when possible to increase battery life. However, direct P2P communication between mobile communication devices can be difficult to facilitate.

For example, to support direct P2P communication, mobile communication devices need to be within a certain geographical range of each other, and users typically have to be aware that both the sending and receiving mobile communication device are within this geographical range. Thus, to support P2P functionality, mobile communication devices typically have to periodically scan for other mobile communication devices in range. This scanning requires extra processing and battery power.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
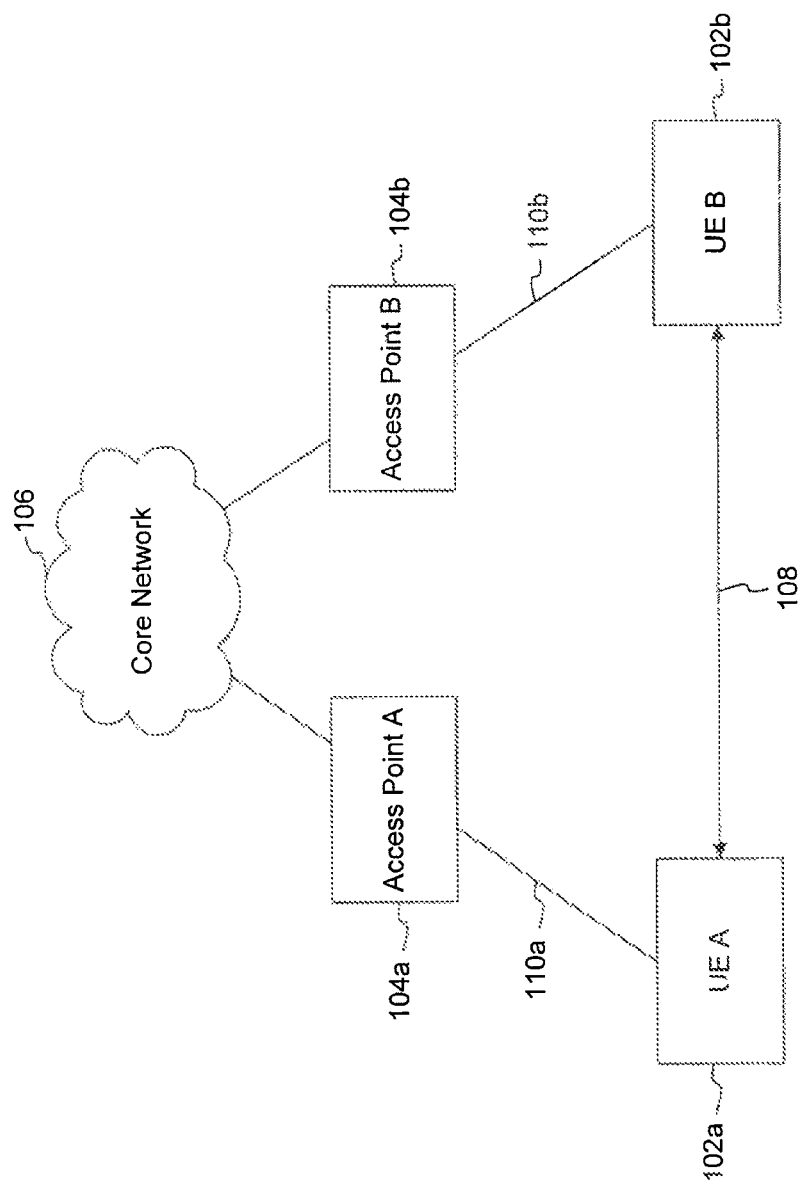
FIG. 1 is a diagram illustrating direct and indirect communication between mobile communication devices.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," and "an example embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. OVERVIEW

Embodiments of the present disclosure provide systems and methods for using geo-fencing techniques to assist in detecting mobile communication devices that are close enough to support direct communication. By using geo-fencing techniques, a mobile communication device can periodically report a general area (geo-fence), such as a cell ID, to a central server instead of periodically determining a precise location (e.g., using Global Positioning Satellite (GPS) functionality), which can consume a large amount of power.

When the server receives the geo-fence information from the mobile communication device, it can determine whether to ask the communication device to report more precise geographic information (e.g., GPS information). For example, a communication device may have a friends list, and the server may determine to ask the communication device to report more precise geographic information if another communication device on the friends list is within the same geo-fence as the reporting communication device. Using this more precise geographic information, the server can determine whether the mobile communication device is close enough to another mobile communication device to support direct communication. The server notifies the mobile communication device that it can initiate direct communication with other nearby devices. Thus, systems and methods according to embodiments of the present disclosure can facilitate direct communication between mobile communication devices while reducing the amount of GPS reporting by a communication device to conserve power.

2. DIRECT AND INDIRECT COMMUNICATION

FIG. 1 is a diagram illustrating direct and indirect communication between mobile communication devices. FIG. 1 shows two mobile communication devices, labeled user equipment (UE) A 102a and UE B 102b. FIG. 1 also shows a core network 106 and two access points—access point A 104a and access point B 104b. In an embodiment, UE A 102a and UE B 102b can communicate with each other directly 108, without an intervening network device. UE A 102a and UE B 102b can also communicate with each other indirectly 110 by communicating through access points 104 of core network 106.

In an embodiment, core network 106 is a network provided by a service provider. For example, core network 106 can be a wireless communication network operating according to a standard, such as 3G or 4G long term evolution (LTE). Core network 106 can also be any other kind of communication network including, but not limited to, a GSM (Global System for Mobile Communications) network and a Wi-Fi network, among others.

Access points 104 can be base stations or wireless access points for core network 106. In an embodiment, access points 104 are implemented as E-UTRAN Node B (eNodeB) elements of an LTE system. In an embodiment, core network 106 and/or access points 104 are used to implement an architecture in accordance with System Architecture Evolution (SAE) of the 3rd Generation Partnership Project (3GPP) LTE wireless communication standard. In an embodiment, this architecture includes one or more Evolved Packet Cores (EPCs) associated with access points 104.

For example, if UE A 102a is within the service area of access point 104a, UE A 102a can send a message through access point A 104a. Access point A 104a can send a message through the service provider infrastructure of core network 106 and can relay this message to access point B 104b that services a geographical area containing UE B 102b. Thus, UEs 102 can communicate with each other indirectly 110 through core network 106 even if UEs 102 are geographically located a large distance from each other. This indirect communication 110 requires more battery power than direct communication 108, so when possible, direct communication 108 can be advantageous to conserve battery power. Additionally, in an embodiment, direct communication 108 can support a higher data rate than indirect communication 110.

In an embodiment, UEs 102 can communicate using a peer-to-peer (P2P wireless direct communication technique, such as, but not limited by, Wi-Fi Direct and Bluetooth. Direct communication 108 also has disadvantages, however. For example, in an embodiment, UE A 102a has to be within a certain predefined range of UE B 102b to directly communicate 108 with UE B 102b. Further, in an embodiment, UE A 102a has to periodically scan for the location and/or presence of UE B 102b to determine that UE B 102b is close enough for direct communication 108. This additional scanning can disadvantageously require UE A 102a to expend additional battery power. Embodiments of the present disclosure facilitate direct communication 108 between UEs 102 while avoiding the need for UEs 102 to periodically scan for in-range UEs by using geo-fence techniques.

3. SYSTEMS FOR ASSISTING PROXIMITY DETECTION USING GEO-FENCING

As discussed above, continually scanning for in-range mobile communication devices for direct communication 108 can disadvantageously require additional battery power to be expended by UEs 102. To avoid expending this additional battery power, systems and methods according to embodiments of the present disclosure can use geo-fencing techniques so that UEs 102 can receive location information of in-range mobile communication devices from a server. For example, in an embodiment, UEs 102 can periodically report information regarding their general geographic area (i.e., geo-fence) to one or more servers in communication with core network 106, and one or more of these servers can ask UEs 102 to provide more precise geographic location information when a mobile communication device comes within the geo-fence. Determining and reporting this geo-fence information consumes less power than determining and reporting the more precise geographic location using, for example, GPS functionality of the mobile communication device. For example, in an embodiment, the geo-fence information can be a cell ID for the mobile communication device.

3.1 Exemplary Mobile Communication Devices

Figure 2:
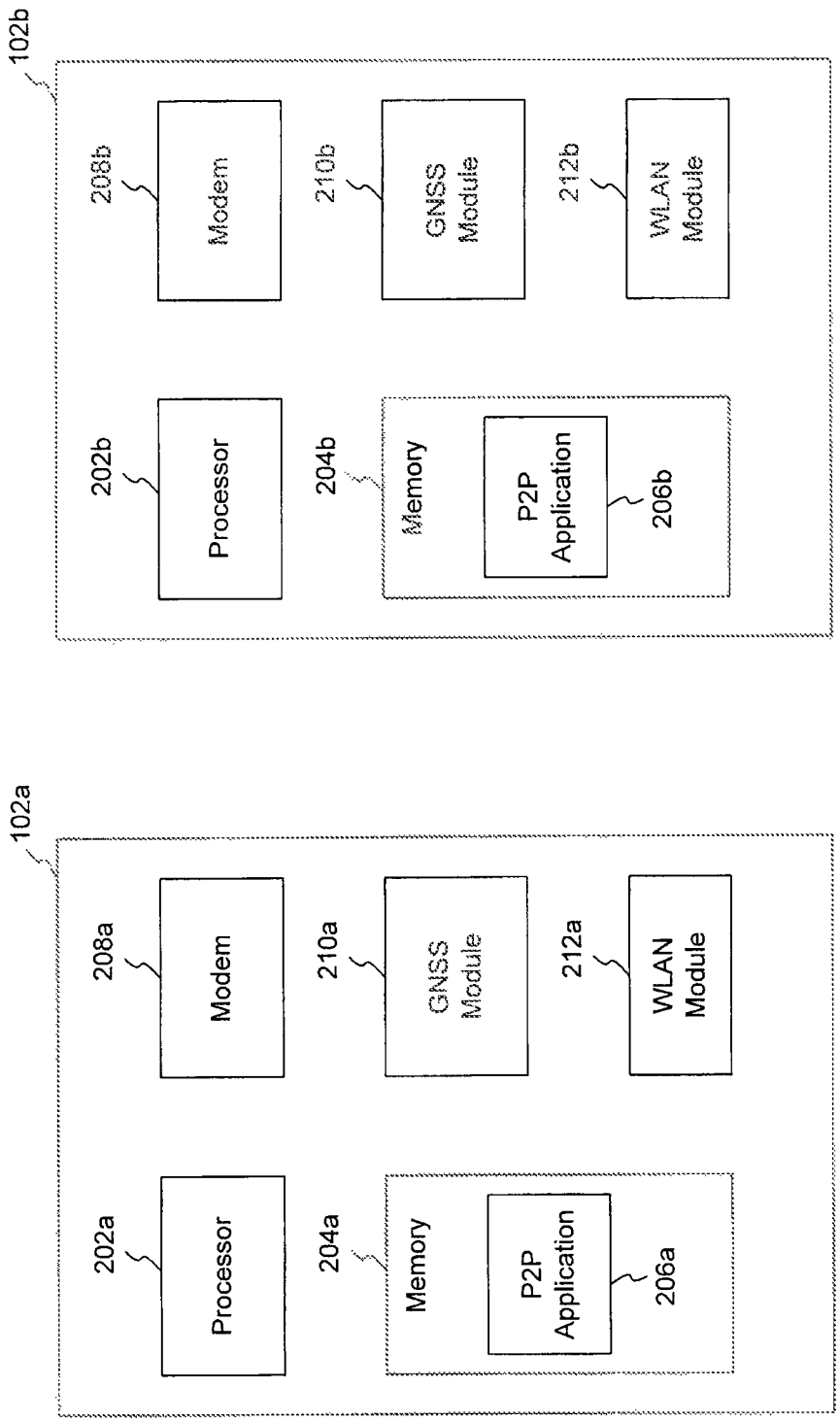
FIG. 2 is a block diagram of components of mobile communication devices in accordance with an embodiment of the present disclosure.

FIG. 2 is a block diagram of components of mobile communication devices in accordance with an embodiment of the present disclosure. In FIG. 2, UEs 102 include processors 202, modems 208, wireless local area network (WLAN) modules 212, Global Navigation Satellite System (GNSS) modules 210, and memories 204. In an embodiment, memories 204 can include one or more P2P applications 206 that can be used over direct communication 108. In an embodiment, each WLAN module 212 includes a respective transmitter and receiver that can be used to facilitate this direct communication. In an embodiment, each GNSS module 210 includes a respective satellite receiver that can be used to determine the geographical location of UEs 102 using satellite positioning. In an embodiment, GNSS modules 210 determine the geographic location of UEs 102 using GPS techniques. Using GNSS modules 210, UEs 102 can periodically send updates containing information about their geo-fence location information to one or more servers in communication with core network 106.

3.2 Exemplary Proximity Services Server Environment

Figure 3:
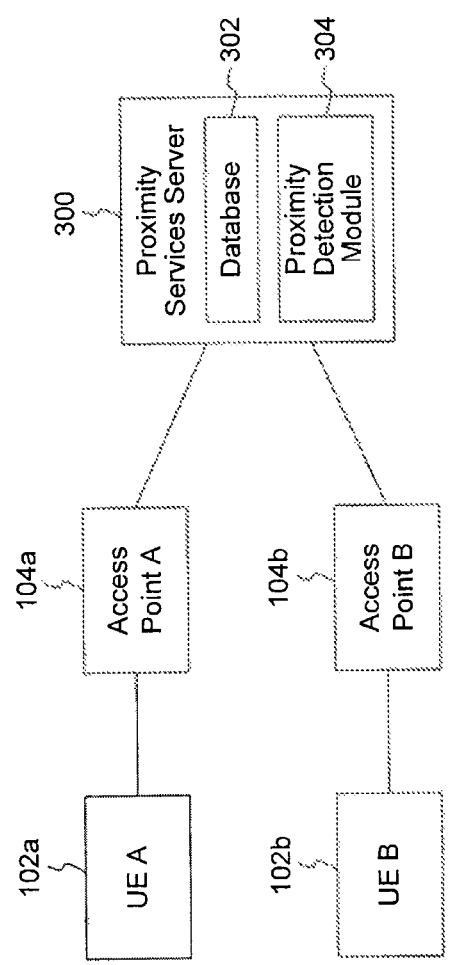
FIG. 3 is a block diagram showing a proximity services server in communication with access points of a core network in accordance with an embodiment of the present disclosure.

FIG. 3 is a block diagram showing a proximity services server in communication with access points of a core network in accordance with an embodiment of the present disclosure. In FIG. 3, proximity services server 300 includes a database 302 and a proximity detection module 304. In an embodiment, UEs 102 can send information regarding their no-fence location information to proximity services server 300 via access points 104. Proximity detection module 304 can determine, based on this geo-fence location information, whether to request more precise proximity information from UEs 102 (e.g., GPS location information) based on, for example, whether another mobile communication device eligible for direct communication 108 is within the same geo-fence as UEs 102. After proximity services server 300 receives this more precise geographic location information from UEs 102, proximity services server 300 sends notifications to UEs 102 regarding mobile communication devices that are close enough to UEs 102 to support direct communication 108.

Proximity services server 300 and/or proximity detection module 304 can be implemented on a device within core network 106 or on a device on a third party network in communication with core network 106. In an embodiment, proximity services server 300 is an application server in an IMS (IP Multimedia Core Network Subsystem) layer of a 3 GPP network.

Proximity services server 300 and/or proximity detection module 304 can be implemented using hardware, software, or a combination of hardware and software. Core network 106 can use a single proximity services server 300 with a single proximity detection module 304 or multiple proximity services servers, each with one or more proximity detection modules in accordance with an embodiment of the present disclosure. For example, in an embodiment, a proximity services server 300 resides in the home public land mobile network (PLMN) of each mobile communication device.

In an embodiment, UEs 102a can periodically send updates containing information regarding their geo-fence locations to proximity services server 300 via access points 104. In an embodiment, proximity services server 300 receives these geo-fence location updates and can optionally store them (e.g., in database 302 or in another memory). Whenever a mobile communication device reports its geo-fence location to proximity services server 300, proximity services serve 300 can determine whether another mobile communication device is within the same geo-fence by accessing this stored information and can request that one or more mobile communication devices within the same geo-fence report more precise geographic information (e.g., using GNSS modules 210). In an embodiment, proximity services server 300 can also store this more precise geographic information (e.g., in database 302 or in another memory). Using this more precise geographic information, proximity services server 300 can determine whether two or more mobile communication devices (e.g., UEs 102) are close enough to each other to support direct communication 108.

In an embodiment, UEs 102 can provide an option to a user to choose whether or not to periodically send these updates. Further, in an embodiment, UEs 102 can enable a user to choose how often these updates should be sent to proximity services server 300. Additionally, in an embodiment, UEs 102 can be configured to detect a change in their geo-fence locations (e.g., based on whether their access points 104 change as UEs 102 move) and to send an update regarding their geographic location in response to detecting this change in geographic location.

3.3 Exemplary Geo-Fence Environment

Figure 4:
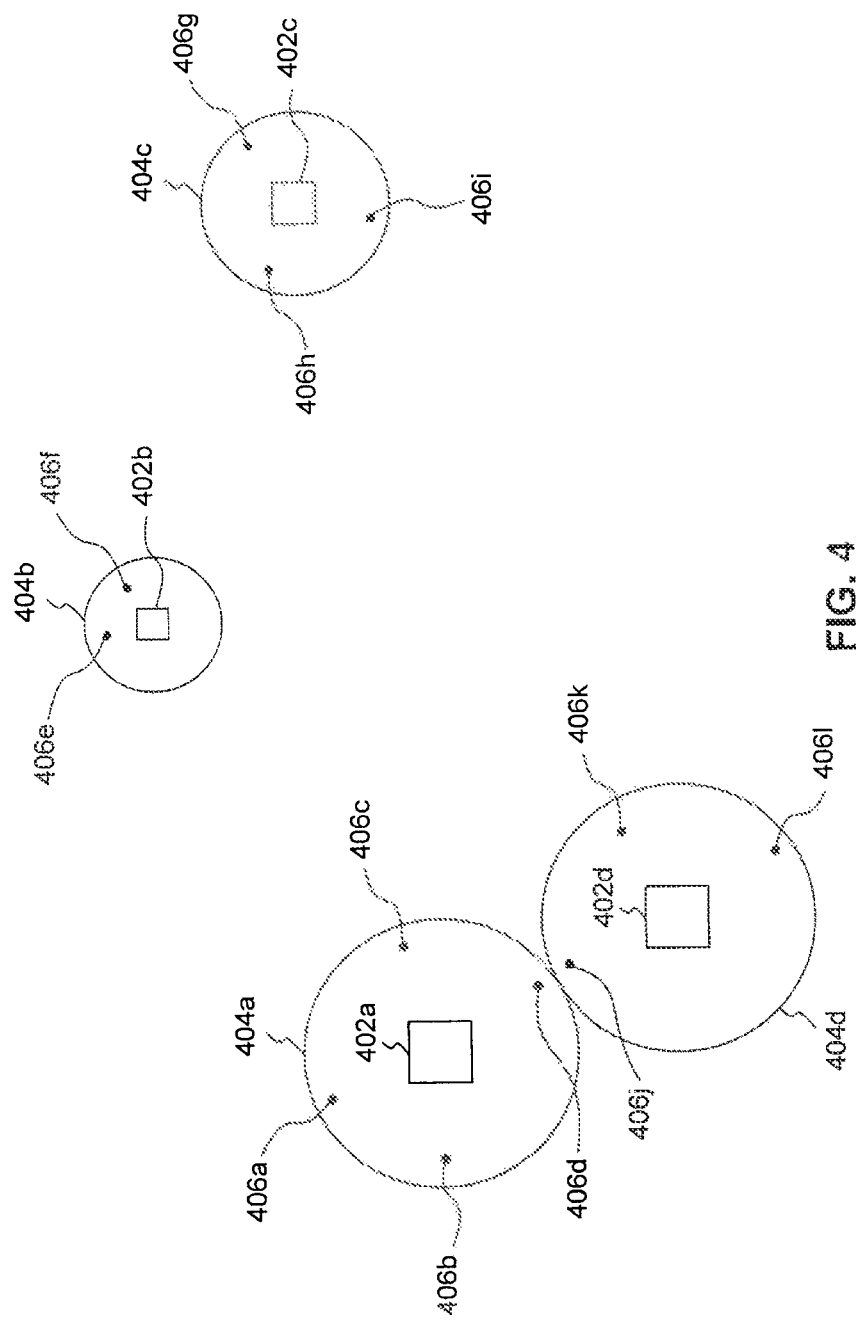
FIG. 4 is a block diagram illustrating an exemplary geo-fence environment in accordance with an embodiment of the present disclosure.

FIG. 4 is a block diagram illustrating an exemplary geo-fence environment in accordance with an embodiment of the present disclosure. The geo-fence environment of FIG. 4 includes a plurality of central locations 402 and a plurality of geo-fences 404 around these central locations 402. In an embodiment, UEs 102 can report that they are within geo-fences 404 to proximity services server 300 from any location within geo-fences 404 (e.g., from precise locations 406). Geo-fences 404 can be any geographic perimeter around any central locations 402 in accordance with an embodiment of the present disclosure. For example, in an embodiment, geo-fences 404 can define the city limits around a city, a particular office building, a user's home, a user's school, or a base station coverage area. In an embodiment, UEs 102 can be configured to store a geo-fence application that is programmed to perform particular operations when entering and/or leaving one or more of geo-fences 404. For example, when UE A 102a leaves geo-fence 404a (e.g., a user's home), UE A 102a can notify the user's secretary (by text, email, or other electronic alert) regarding when the user of UE A 102a can be expected to arrive at the office.

In an embodiment, central locations 402 correspond to access points 104, and geo-fences 404 correspond to the geographic area(s) serviced by access points 104 from which UEs 102 can access core network 106. For example, if UE A 102a is at precise location 406d and UE B 102b is at precise location 406c, UEs 102 can report that they are within geo-fence 404 to proximity services server 300. For example, in an embodiment, UEs 102 can report their cell IDs to proximity services server 300. In an embodiment, these cell IDs uniquely identify a serving base station, and thus these cell IDs can notify proximity services server that both UE A 102a and UE B 102b are served by the same base station. Proximity services server 300 can determine that both UE A 102a and UE B 102b are within geo-fence 404a and can then request that UE A 102a and UE B 102b report precise locations 406c and 406d so that proximity services server 300 can determine whether UE A 102a and UE B 102b are close enough to each other to support direct communication 108. UEs 102 report precise locations 406c and 406d to proximity services server 300 using GNSS modules 210. Proximity services server 300 determines, based on this more precise geographic location information, whether UE A 102a and UE B 102b are close enough to each other to support direct communication 108 and sends a notification to UE A 102a and/or UE B 102b in response to determining that UEs 102 are in range of direct communication 108.

4. NOTIFICATIONS

When proximity services server 300 determines that two or more mobile communication devices are geographically close enough to each other to support direct communication 108, proximity detection module 304 can notify one or more of these devices that an option for direct communication is available. Notifications in accordance with embodiments of the present disclosure include, but are not limited to, pop up boxes, text messages, email notifications, and instant message notifications, among others. These notifications can be enabled or disabled by a user of a mobile communication device (e.g., UEs 102).

Further, in an embodiment, these notifications can be used to update software stored on a mobile communication device that can enable a user to check whether direct communication is available. For example, in an embodiment, proximity services server 300 can send a notification to software stored on UE A 102a (e.g., P2P application 206a or another application), and this software can update the status of mobile communication devices that are geographically close enough to UE A 102a to support direct communication 108. For example, a user of UE A 102a can periodically check this software to determine, based on these updates, if UE B 102b or any other device is geographically close enough to UE A 102a to support direct communication 108. This software can also optionally provide the user with the option to initiate direct communication with an in-range mobile communication device.

5. FREQUENCY OF REPORTING GEO-FENCES AND PRECISE LOCATIONS

In an embodiment, UEs 102 can be configured to periodically report their precise locations 406 if proximity services server 300 determines that UEs 102 are within the same geo-fence 404 but are not close enough to each other to support direct communication 108. For example, proximity services server 300 can request UEs 102 to report their precise locations 406 if proximity services server 300 determines that UEs 102 are both within geo-fence 404a. If UE A 102a reports that it is at precise location 406b and UE B 102b reports that it is at precise location 406c, proximity services server 300 may determine that UEs 102 are not close enough to support direct communication. In an embodiment, proximity services server 300 can then send a request to UEs 102 to periodically send updates regarding their precise locations 406 so that proximity services server 300 can monitor their movements to determine if they come in range of direct communication.

In an embodiment, UEs 102 can be configured to determine and/or report their precise locations 406 and/or geo-fences 404 when UEs 102 change location. Thus, in an embodiment, if UEs 102 remain stationary, it is not necessary for UEs 102 to expend additional battery power to determine and report precise locations 406 and/or geo-fences 404. In an embodiment, UEs 102 can determine and/or report their precise locations 406 and/or geo-fences 404 when UEs 102 move a predetermined distance away from their last reported precise locations 406 and/or geo-fences 404. In an embodiment, this predetermined distance is configurable (e.g., via a setting of one or more software programs stored in memory of UEs 102).

In an embodiment, the frequency that UEs 102 periodically report their geo-fences 404 or precise locations 406 can be modified based on changing circumstances. For example, in an embodiment, UEs 102 can be configured to report their geographic locations more frequently if proximity services server 300 determines that two or more mobile communication devices are within the same geo-fence but are not close enough to support direct communication 108. For example, proximity services server 300 can determine, based on reported precise locations 406 from UEs 102, that UEs 102 are moving closer to each other and can request that the frequency of precise location reporting from UEs 102 be increased. In an embodiment, if proximity services server 300 determines, based on reported precise locations 406 from UEs 102, that UEs 102 are moving farther away from each other, proximity services server 300 can request that the frequency of precise location reporting from UEs 102 be decreased.

In an embodiment, if UEs 102 are in two separate geo-fences that are next to each other, UEs 102 can increase the frequency of reporting their precise locations and/or geo-fences. For example, if proximity services server 300 determines, based on precise location information reported from UEs 102, that UE A 102a is at precise location 406j and UE B 102b is at precise location 406d, proximity services server 300 can request that UEs 102 increase the frequency of reporting their precise locations 406.

Additionally, in an embodiment, proximity services server 300 can check to see if UEs 102 are close enough to support direct communication if UEs 102 are in two separate geo-fences that are next to each other. For example, proximity services server 300 may determine that UE A 102a at precise location 406j and UE B 102b at precise location 406d are close enough to support direct communication even though UE A 102a and UE B 102b are in two different geo-fences 404a and 404d.

6. RETURNING TO INDIRECT COMMUNICATION

In an embodiment, UEs 102 can terminate direct communication 108 and can initiate indirect communication 110 at any time. For example, a user of UE A 102a may determine to terminate direct communication 108 with UE B 102b after a call with a user of UE B 102b has ended or after UE A 102a has finished using P2P application 206a with UE B 102b.

Additionally, in an embodiment, UEs 102 can initiate indirect communication 110 when performance begins to degrade. For example, in an embodiment, UEs 102 can monitor one or more signal performance metrics (e.g., signal strength, signal quality, noise, data rate, and bit error rate (BER), among others), and when one or more of these signal performance metrics drops below a predetermined threshold, UEs 102 can initiate indirect communication 110. In an embodiment, this predetermined threshold can be configurable (e.g., by a user or a service provider of core network 106).

Further, in an embodiment, UEs 102 can initiate indirect communication 110 when UEs 102 move further apart. For example, UEs 102 can send periodic updates regarding their geo-fences 404 and/or precise locations 406 to proximity services server 300, and when proximity detection module 304 determines that UE A 102a has moved a predetermined distance away from UE B 102b, proximity detection module 304 can notify UE A 102a and/or UE B 102b. In an embodiment, this predetermined distance can be configurable (e.g., by a user or a service provider of core network 106).

UEs 102 can provide the user with an option to return to indirect communication 110 or can initiate indirect communication automatically in accordance with an embodiment of the present disclosure. For example, UEs 102 can display a notification to a user when performance degrades or when UEs 102 move a predetermined distance away from each other. Alternatively, in an embodiment, UEs 102 can automatically initiate indirect communication 110 when performance degrades or when UEs 102 move a predetermined distance away from each other.

7. FRIENDS LIST

In an embodiment, proximity services server 300 can send notifications to a mobile communication device whenever any device on a list of eligible devices associated with the mobile communication device moves within range of direct communication 108. For example, in an embodiment, UE A 102a can send a list of "friends" to proximity services server 300, and proximity services server 300 can store this list of friends associated with UE A 102a in database 302. This list of friends, can be, for example, a contact list stored on UE A 102a and/or a list of previous outgoing calls from UE A 102a and/or incoming calls to UE A 102a. Additionally, this list of friends can be associated with a specific device, a specific user, a specific user ID, or a group of users or devices, among others. In an embodiment, UE A 102a can send periodic updates regarding this list of friends to proximity services server 300.

Proximity services server 300 can notify UE A 102a whenever one of the devices on its friends list comes close enough to UE A 102a to support direct communication 108 between UE A 102a and the device. This enables UE A 102a to avoid receiving notifications for devices that UE A 102a is unlikely to want to establish direct communication 108 with. For example, UE A 102a can add UE B 102b to its friends list and can notify proximity services server 300 that UE B 102b is a device on its friends list. Proximity services server 300 can store this information in database 302 and can notify UE A 102a whenever UE B 102b is close enough to UE A 102a to support direct communication 108 between UE A 102 and UE B 102b. In an embodiment, other mobile communication devices not on the friends list will not cause a notification when in range of UE A 102a.

In an embodiment, proximity services server 300 can require that both UE A 102a and UE B 102b add each other on their respective friends list before sending notifications to either UE A 102 and UE B 102b. In an embodiment, this requirement can be configurable by UEs 102. For example, in an embodiment, a user of UE A 102a may want only devices that it has added to the friends list associated with UE A 102a to know when it is in range for privacy reasons. Alternatively, a user of UE A 102a may not wish to have to add each device to its own friends list to enable other devices to receive notifications regarding the proximity of UE A 102a to each device.

In an embodiment, mobile communication devices can request that proximity services server 300 notify them when specific devices designated as friends (and/or a specific user, a specific user ID, or a group of users or devices, among others) come close enough to support direct communication 108. For example, in an embodiment, UE A 102a can send a request to proximity services server to send a notification to UE A 102a when UE B 102b comes come close enough to support direct communication 108 between UE A 102a and UE B 102b. In an embodiment, this notification can be sent to UE A 102a in the form of a pop up box, text message, email notification, or an instant message notification, among others Alternatively, this notification can be used to update software stored on UE A 102a that can enable a user to check whether direct communication is available.

8. EXAMPLE OF PROXIMITY DETECTION USING GEO-FENCING

An example of proximity detection using geo-fencing will now be discussed with reference to FIGS. 1-4. In an embodiment, UE A 102a registers for proximity services service with proximity services server 300. In an embodiment, UE A 102a can send a list of eligible communication devices (e.g., a friends list) to proximity services server 300. Proximity services server 300 stores this list in memory (e.g., in database 302). UE A 102a can request that proximity services server 300 send a notification to UE A 102a when another mobile communication device (e.g., a mobile communication device on its friends list) comes within range of direct communication 108. In an embodiment, UE A 102a can also specify a window of time during which this request is valid. In an embodiment, the duration of the window of time is configurable, and in an embodiment, the request expires after this window of time has elapsed.

UE A 102a periodically sends information regarding its geo-fence 404 to proximity services server 300. Proximity services server 300 determines whether to request that UE A 102a report its precise location 406. For example, proximity services server 300 can request that UE A 102a report its precise location 406 if multiple communication devices are within the same geo-fence 404 and are eligible for direct communication 108 (e.g., if multiple communication devices are within the same geo-fence 404 and are on each other's friends lists). Proximity services server 300 also receives geo-fence information from other mobile communication devices (e.g., from UE B 102b) and determines whether to request that these mobile communication devices report their precise locations 406.

UE A 102a receives the request to report its precise location 406 from proximity services server 300. In an embodiment, UE A 102a can automatically process this request by turning on GNSS module 210a without additional authorization from a user so that this request is transparent to the user. Alternatively, UE A 102a can prompt the user for authorization to turn on GNSS module 210a. Additionally, in an embodiment, the user can configure a setting on one or more software programs stored in a memory of UE A 102a that determines whether UE A 102a is authorized to turn on GNSS module 210a in response to receiving a request from proximity services server 300. In an embodiment, UE A 102a can be configured to turn off GNSS module 210a after determining and/or sending its precise location 406 to conserve power.

If UE A 102a is authorized to provide its precise location 406 to proximity services server 300, UE A 102a determines its precise location 406. For example, UE A 102a may determine, using GNSS module 210a, that its precise location 406 is precise location 406c. UE A 102a sends a message to proximity services server 300 containing precise location 406c. Proximity services server 300 receives this information, and in an embodiment, proximity services server 300 stores this information in memory (e.g., in database 302). Proximity services server 300 determines whether two or more eligible mobile communication devices are close enough to support direct communication 108 based on stored information. For example, in an embodiment, proximity services server 300 determines whether two or more mobile communication devices that are on each other's friends lists are close enough to support direct communication 108. If proximity services server 108 determines that two or more eligible mobile communication devices are close enough to support direct communication 108, proximity services server 300 sends a notification to one or more of these devices informing them which mobile communication devices are in range of direct communication 108. If proximity services server 108 determines that two or more eligible mobile communication devices are close to each other but not within range of direct communication 108, proximity services server 108 can send a request to the mobile communication devices to periodically send updates regarding their precise locations 406.

In an embodiment, proximity services server can send a request for an updated precise location 406 if stored precise location information is outdated. For example, proximity services server 300 can receive precise location information from UE A 102a and can determine, based on stored precise location information for UE B 102b, that UE B 102b is in range of UE A 102a based on its stored precise location information for UE B 102b. If the precise location information for UE B 102b is older than a predetermined time threshold, proximity services server 300 can request updated precise location information from UE B 102b so that proximity services sever 300 can make a better determination regarding how close UE A 102a and UE B 102b are before sending notifications to UE A 102a and/or UE B 102b. In an embodiment, this predetermined time threshold is configurable (e.g., via a setting of one or more software programs stored in memory of proximity services server 300).

UE A 102a receives a notification from proximity services server 300 regarding communication devices eligible for direct communication 108. For example, this notification can inform UE A 102*a* that UE B 102*b* is close enough to UE A 102*a* to support direct communication 108. UE A 102*a* can then determine whether to initiate direct communication 108 with UE B 102*b* or another mobile communication device in range of direct communication 108. In an embodiment, UE A 102*a* can display a prompt to a user regarding a list of eligible mobile communication devices in range of direct communication 108, in an embodiment, UE A 102*a* can update a software program that is configured to inform a user of the mobile communication devices in range of direct communication 108. In an embodiment, UE A 102*a* can be configured to automatically initiate direct communication 108 if a user of UE A 102*a* initiates communication (e.g., via a phone call or P2P application) with a mobile communication device in range of direct communication 108. In an embodiment, a setting of a software program stored in memory of UE A 102*a* can be configured (e.g., by a user of UE A 102*a*) to determine whether UE A 102*a* should automatically initiate direct communication 108 with a mobile communication device in range of direct communication 108 or whether UE A 102*a* should display a prompt and/or an option to a user before initiating direct communication 108.

9. METHODS

Figure 5A:
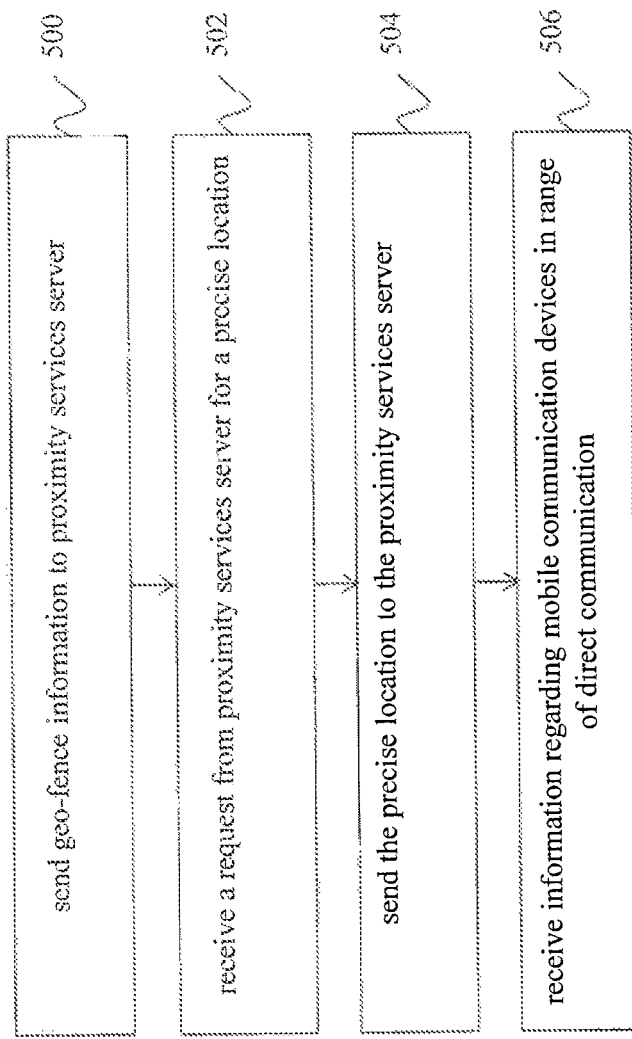
FIG. 5A is a flowchart illustrating a method for proximity detection using geo-fencing at a mobile communication device.

A method for proximity detection using geo-fencing at a mobile communication device will now be described with reference to FIG. 5A. In step 500, geo-fence information is sent to a proximity services server. For example, UE A 102*a* sends geo-fence 404*a* to proximity services server 300. As discussed above, the geo-fence information identifies a general geographic area (or perimeter) for the reporting UE 102, such as: a particular city, a serving base station with a known coverage area, a particular shopping mall or airport, an office building, a sports stadium, resort complex, among others. The geo-fence information is in contrast to more specific location information, such location coordinates provided by satellite navigation, such as GPS. In step 502, a request is received from a proximity services server for a precise location. For example, UE A 102*a* receives a request for its precise location within geo-fence 404*a*. In step 504, the precise location is sent to the proximity services server, using for example location coordinates provided by satellite navigation, such as GPS. For example, UE A 102*a* sends precise location 406*c* to proximity services server 300. In step 506, information regarding other mobile communication devices in range of direct communication is received. For example, UE A 102*a* receives information from proximity services server 300 regarding mobile communication devices in range of direct communication 108 of precise location 406*c*. In an embodiment, UE A 102*a* can then initiate direct communication 108 with one of these mobile communication devices.

Figure 5B:
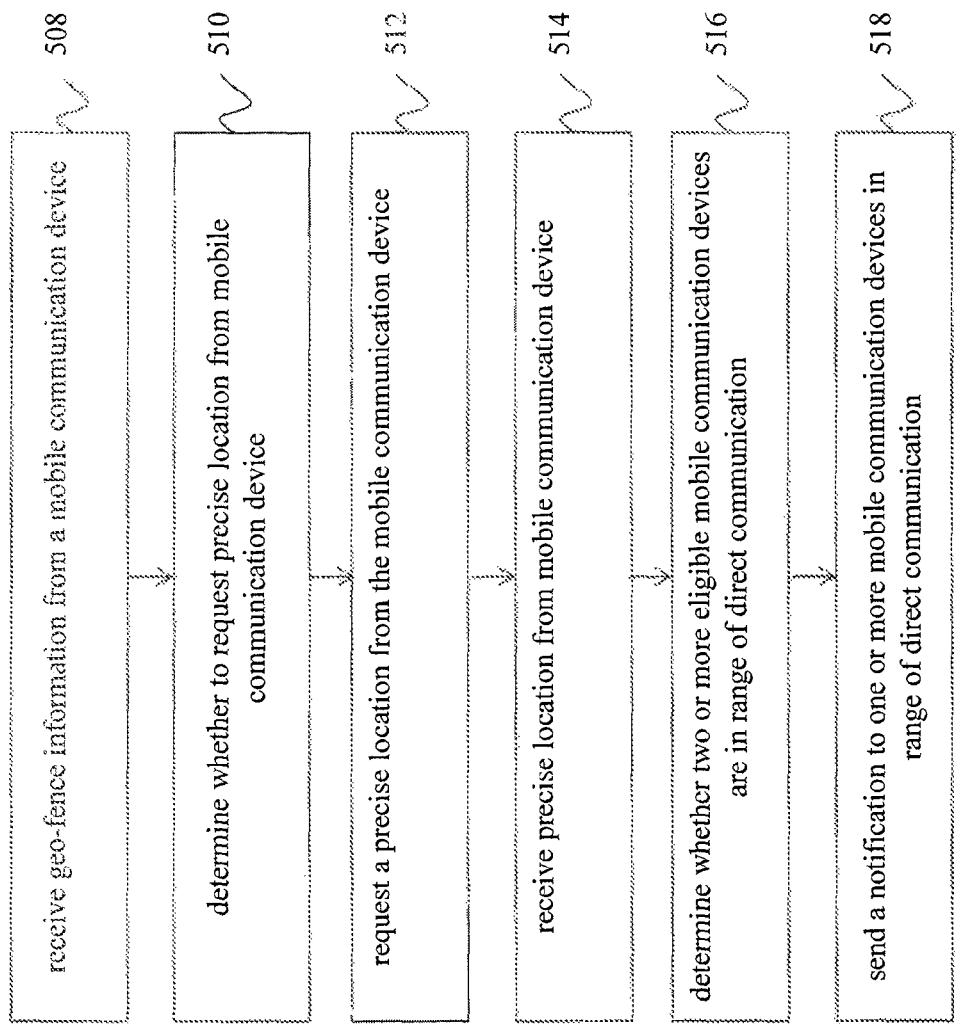
FIG. 5B is a flowchart illustrating a method for proximity detection using geo-fencing at a proximity services server.

A method for proximity detection using geo-fencing at a proximity services server will now be described with reference to FIG. 5B. In step 508, geo-fence information is received from a mobile communication device. For example, proximity services server 300 receives information from UE A 102*a* indicating that it is within a particular geo-fence, such as geo-fence 404*a*. In step 510, a determination is made regarding whether to request a precise location from mobile communication device. For example, proximity services server 300 determines, based on stored information regarding geographic locations of other mobile communication devices, whether to request precise location information from UE A 102*a*. In step 512, a precise location is requested from the mobile communication device. For example, proximity services server 300 requests the precise location of UE A 102*a* within geo-fence 404*a*.

In step 514, a precise location is received from the mobile communication device, including for example location coordinates provided by satellite navigation, such as GPS. For example, proximity services server 300 receives precise location 406*c* from UE A 102*a*. In step 516, a determination is made regarding whether two or more eligible mobile communication devices are in range for direct communication. For example, proximity services server 300 determines whether another eligible mobile communication device (e.g., a mobile communication device on the "friends" list of UE A 102*a*) is in range of direct communication of precise location 406*c*. In step 518, a notification is sent to one or more mobile communication devices in range of direct communication. For example, proximity services server 300 sends a notification to UE A 102*a* informing UE A 102*a* which eligible mobile communication devices are close enough to UE A 102*a* to support direct communication.

10. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented in hardware, software, or some combination thereof. For instance, signal processing functions can be implemented using computer processors, computer logic, application specific circuits (ASIC), and digital signal processors, among others, as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM, Accordingly, any tangible non-transitory computer storage medium having computer program code that cause a processor to perform the signal processing, functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A first mobile communication device, comprising:
   a processor configured to:
      send first information regarding a first geographic location of the first mobile communication device to a server,
      receive a request from the server for periodic reports of a second geographic location of the first mobile communication device within the first geographic location,
      send second information regarding the second geographic location to the server based on the request, and
      receive a message from the server indicating that a second mobile communication device is within a predetermined range of the second geographic location; and
   a wireless local area network (WLAN) module configured to:
      establish a direct wireless communication link with the second mobile communication device based on the message,
   wherein a frequency of the periodic reports is determined based on movement of the first mobile communication device and movement of the second mobile communication device.

2. The first mobile communication device of claim 1, wherein the first geographic location is a geo-fence containing the first mobile communication device.

3. The first mobile communication device of claim 1, wherein the first geographic location is a cell ID associated with a base station serving the first mobile communication device.

4. The first mobile communication device of claim 1, further comprising:
   a Global Navigation Satellite System (GNSS) module configured to provide the second geographic location.

5. The first mobile communication device of claim 1, wherein the processor is further configured to:
   send a list of devices to the server, wherein the list of devices comprises the second mobile communication device.

6. The first mobile communication device of claim 1, wherein the processor is further configured to:
   update, based on the message, an application indicating other mobile communication devices that are within the predetermined range of the second geographic location.

7. The first mobile communication device of claim 1, wherein the processor is configured to send the first geographic location without powering up a Global Navigation Satellite System (GNSS) module of the first mobile communication device.

8. The first mobile communication device of claim 1, wherein the processor is configured to receive the request from the server based on the second mobile communication device being within the first geographic location.

9. A server, comprising:
   a database to:
      store information regarding a second mobile communication device associated with a first mobile communication device; and
   a proximity detection module configured to:
      receive information regarding a first geographic location of the first mobile communication device, and
      send a message to the first mobile communication device, based on the received information regarding the first geographic location of the first mobile communication device and the information regarding the second mobile communication device indicating that the second mobile communication device is within the first geographic location, to request periodic reports of a second geographic location from the first mobile communication device at a frequency determined based on movement of the first mobile communication device and movement of the second mobile communication device, wherein the second geographic location is within the first geographic location.

10. The server of claim 9, wherein the proximity detection module is further configured to:
    receive the second geographic location from the first mobile communication device;
    determine, based on the second geographic location and the information regarding the second mobile communication device, whether the second mobile communication device of the plurality of mobile communication devices is geographically close enough to the first mobile communication device for direct wireless communication; and
    notify the first mobile communication device that the first mobile communication device is geographically close enough to the second mobile communication device for direct wireless communication.

11. The server of claim 9, wherein the first geographic location is a geo-fence containing the first mobile communication device.

12. The server of claim 9, wherein the first geographic location is a cell ID of a base station serving the first mobile communication device.

13. The server of claim 9, wherein the second geographic location is a Global Positioning Satellite (GPS) location of the first mobile communication device.

14. The server of claim 9, wherein the database is further configured to:
    store a list of devices comprising the second mobile communication device.

15. The server of claim 9, wherein the database is further configured to:
    store the first geographic location and the second geographic location.

16. A method, comprising:
sending a general geographic location of a first mobile communication device to a server;
receiving a request from the server for periodic reports of a more precise geographic location of the first mobile communication device within the general geographic location;
sending the more precise geographic location to the server based on the request; and
receiving a message from the server indicating that a second mobile communication device is within a predetermined range of the more precise geographic location of the first mobile communication device,
wherein a frequency of the periodic reports is determined based on movement of the first mobile communication device and movement of the second mobile communication device.

17. The method of claim 16, further comprising:
sending a list of devices to the server, wherein the list of devices comprises the second mobile communication device.

18. The method of claim 16, further comprising:
receiving, at the server, the general geographic location of the first mobile communication device;
determining, based on the general geographic location and stored information regarding a plurality of geographic locations associated with a plurality of mobile communication devices, whether to request the more precise geographic location of the first mobile communication device; and
sending a message to the first mobile communication device requesting the more precise geographic location of the first mobile communication device.

19. The method of claim 18, further comprising:
receiving, at the server, the more precise geographic location of the first mobile communication device;
determining, based on the more precise geographic location of the first mobile communication device and the stored information, whether the second mobile communication device is geographically close enough to the first mobile communication device for direct wireless communication; and
notifying the first mobile communication device that the first mobile communication device is geographically close enough to the second mobile communication device for direct wireless communication.

20. The method of claim 16, wherein the general geographic location is a geo-fence containing the first mobile communication device, and wherein the more precise geographic location of the first mobile communication device is a geographic coordinate of the first mobile communication device.

21. The method of claim 16, wherein the request from the server is received based on the second mobile communication device being within the first geographic location.

* * * * *